United States Patent
Yukioka (10) Patent No.: US 9,234,457 B1
(45) Date of Patent: Jan. 12, 2016

(54) MARINE ENGINES AND BALANCE SHAFT ARRANGEMENTS FOR MARINE ENGINES

(75) Inventor: Masahiro Yukioka, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 957 days.

(21) Appl. No.: 13/364,131

(22) Filed: Feb. 1, 2012

(51) Int. Cl.
*F02B 61/04* (2006.01)
*F02B 75/02* (2006.01)

(52) U.S. Cl.
CPC ......... *F02B 61/045* (2013.01); *F02B 2075/027* (2013.01)

(58) Field of Classification Search
CPC . F02B 61/045; F02B 2075/027; F16F 15/265
USPC .............................. 123/192.2, 193.2; 74/603
See application file for complete search history.

(56) References Cited

U.S. PATENT DOCUMENTS

| 6,439,188 | B1 | 8/2002 | Davis |
| 7,748,288 | B2 * | 7/2010 | Chevalier et al. ............... 74/409 |
| 2007/0012130 | A1 * | 1/2007 | Chevalier et al. ............... 74/409 |
| 2008/0092389 | A1 * | 4/2008 | Neitz et al. ................... 29/893.2 |

FOREIGN PATENT DOCUMENTS

FR  2720464 A1 * 12/1995
KR  2004026966 A * 4/2004 ............. F02B 61/04

OTHER PUBLICATIONS

Ishikawa, Makoto et al, "Development of Resin Gear Balance Shaft System for 2AZ-FE Engine", JSAE Review, 2002, vol. 23, pp. 27-32.
Yamaha Twin Counter Balancer Shafts, Yamaha Motor Corporation, http://www.yamaha-motor.com/outboard/05pi/fl50/05pi.aspx, last visited Mar. 13, 2012.
Kawasaki ZRX1100 Motorcycle Service Manual, Second Edition (2), Apr. 1, 1999.
Internal Combustion Engine Handbook Edited by Richard Van Basshuysen and Fred Schafer, SAE International, Siemens VDO Automotive, cover and pp. 66-67, Copyright 2004.

* cited by examiner

*Primary Examiner* — Lindsay Low
*Assistant Examiner* — Kevin Lathers
(74) *Attorney, Agent, or Firm* — Andrus Intellectual Property Law, LLP (57) ABSTRACT

A balance shaft arrangement is for a marine engine having a crankshaft supported for rotation about a crankshaft axis and a drive gear supported for rotation with the crankshaft. The balancing arrangement has at least one balance shaft, and a driven gear being driven into rotation by the drive gear, the driven gear being connected to the balance shaft so as to drive the balance shaft into rotation. The driven gear is selectively radially positionable towards and away from the drive gear. A dampening member is disposed between the driven gear and the balance shaft, the dampening member accommodating radial positioning of the driven gear with respect to the balance shaft.

11 Claims, 7 Drawing Sheets

MARINE ENGINES AND BALANCE SHAFT ARRANGEMENTS FOR MARINE ENGINES

FIELD

The present disclosure relates to marine engines having arrangements for balancing the effects of secondary vibrational forces.

BACKGROUND

U.S. Pat. No. 6,439,188; the disclosure of which is incorporated herein by reference in entirety, discloses a four-cycle, four-cylinder, in-line internal combustion engine provided with a housing structure that contains two shafts which rotate in opposite directions to each other and at the same rotational velocity. Pairs of counterweights are attached to the two shafts in order to provide a counterbalance force which is generally equal to an opposite from the secondary shaking force which results from the reciprocal movement of the pistons of the engine.

SUMMARY

This summary is provided to introduce a selection of concepts that are further described below in the detailed description. This summary is not intended to identify key or essential features of the claimed subject matter, nor is it intended to be used as an aide in limiting the scope of the claimed subject matter. Examples of marine engines and balance shaft arrangements for marine engines are herein disclosed. In some examples, balance shaft arrangements are provided for marine engines having a crankshaft supported for rotation about a crankshaft axis and a drive gear supported for rotation on the crankshaft. The balancing arrangements have at least one balance shaft, and a driven gear being driven into rotation by the drive gear, the driven gear being connected to the balance shaft so as to drive the balance shaft into rotation. The driven gear is selectively radially positionable towards and away from the drive gear. A dampening member is disposed between the driven gear and the balance shaft, the dampening member accommodating radial positioning of the driven gear with respect to the balance shaft.

BRIEF DESCRIPTION OF THE DRAWINGS

Embodiments of marine engines and balance shaft arrangements for marine engines are described with reference to the following figures. The same numbers are used throughout the figures to reference like features and components.

DETAILED DESCRIPTION OF THE DRAWINGS

In the present disclosure, certain terms have been used for brevity, clearness, and understanding. No unnecessary limitations are to be implied therefrom beyond the requirement of the prior art because such terms are used for descriptive purposes only and are intended to be broadly construed. The different engine arrangements described herein may be used alone or in combination with other engine arrangements. Equivalents, alternatives, and modifications are possible within the scope of the appended claims.

Figure 1:
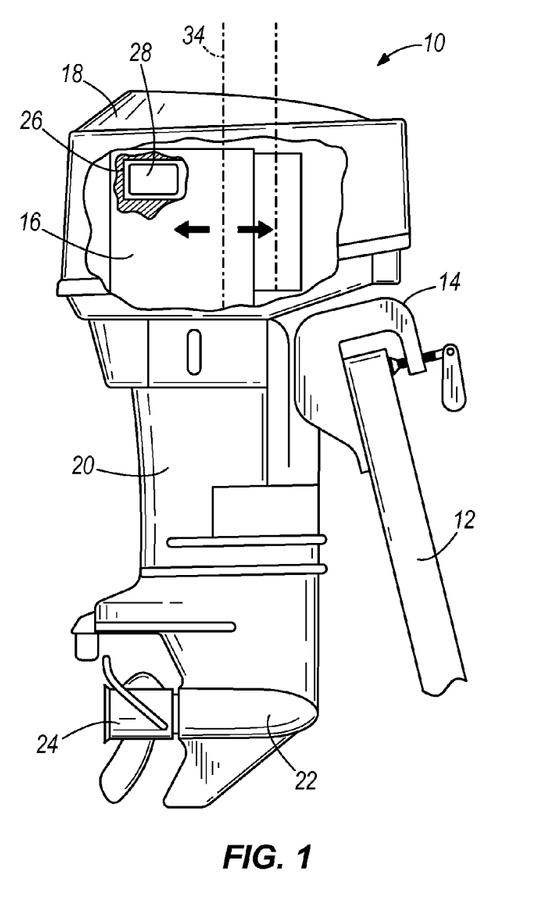
FIG. 1 depicts an outboard motor.

FIG. 1 depicts an outboard motor 10 attached to a transom 12 of a marine vessel by a transom bracket 14. It should be recognized that although the present disclosure describes examples specific to an outboard motor 10, the present invention is applicable to other types of internal combustion engine applications. For example, the concepts of this disclosure can pertain to inboard motors, stern drives, inboard/outboard motors, and/or the like. In FIG. 1, the outboard motor 10 has a cowl 18 and an internal combustion engine, shown schematically at 16 under the cowl 18. The outboard motor 10 also has a driveshaft housing 20 and a gear housing 22. A vertically disposed driveshaft (not shown) is supported in the driveshaft housing 20 and connected in torque transmitting relation, through a gearing arrangement (not shown) within the gear housing 22, to a horizontally disposed propeller shaft (not shown) to which a propeller 24 is attached for rotation. As explained further herein below, the driveshaft is attached in torque-transmitting relation with a crankshaft of the engine 16.

Figure 2:
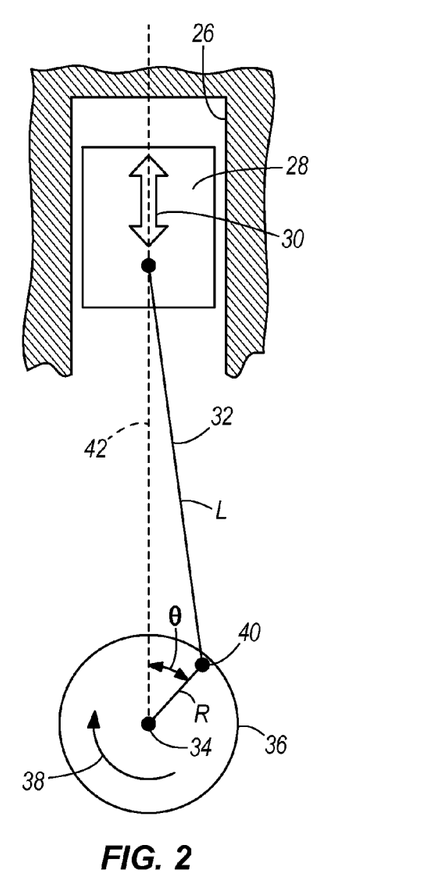
FIG. 2 schematically depicts geometry of a piston and crankshaft.

FIG. 2 schematically depicts a cylinder 26 of the internal combustion engine and a piston 28 disposed in the cylinder 26 for reciprocating motion, as represented by arrow 30. The piston 28 is attached to a connecting rod 32 which, in turn, is connected to a crankshaft which rotates about its axis 34. The circle 36 in FIG. 2 represents the area in which the crankshaft is confined for rotation about its axis 34 in the direction represented by arrow 38. The connecting rod 32 has a length L and is connected to the crankshaft at point 40, which is a distance R from the axis 34. As the crankshaft rotates about its axis 34, the relationship between the connecting rod L, radius R, and the connection to the piston 28 determine the specific relationship between the rotation of the crankshaft and the reciprocal movement of the piston 28. It should be understood that although the piston's movement is illustrated in FIG. 2 as vertical, the illustration in FIG. 1 more accurately shows the relationship between the vertical axis 34, about which the crankshaft rotates, and the position of the piston 28 within the associated cylinder 26.

Referring to FIG. 2 it can be seen that as the piston 28 moves away from its top dead center position in a direction toward the axis 34 of the crankshaft, point 40 moves both downward in FIG. 2 and away from the dashed line 42 which is used to illustrate the direction in which the piston 28 moves. This movement of point 40, both in a downward direction and in a direction away from the dashed line 42, accelerates the piston 28 away from its top dead center position. This is true between the range of values of θ between 0° and 90°. However, between magnitudes of θ of 90° and 180°, point 40 moves downward and towards dashed line 42. As a result, although point 40 is moving downward in FIG. 2 within this range, its movement towards dashed 42 does not serve to add to the acceleration effect of the rotation of the crankshaft. As a result, the piston 28 experiences a greater acceleration, in the absolute sense, when it is near its top dead center position (i.e. θ=0°) than it experiences when it is near its bottom dead center position (i.e. θ=180°). This difference in accelerations is important to the dynamics of an engine, because the acceleration acts on the mass of the piston assembly to create forces which are asymmetrical as the piston 28 moves through its entire reciprocal path from top dead center to bottom dead center and back to top dead center. These secondary forces are in a direction from left to right in FIG. 1. In other words, the forces oscillate from a forward direction, in the direction of travel of the marine vessel, to a rearward direction which is opposite the direction of travel of the marine vessel. These forces, sometimes referred to as "shaking forces" can be significant in engines with larger displacements, such as above 2.0 liters. In an automobile engine, these secondary forces result in vertical shaking of the engine. In a marine engine used in association with an outboard motor, such as that which is illustrated in FIG. 1, these forces result in horizontal shaking forces in directions from forward to rearward.

Figure 3:
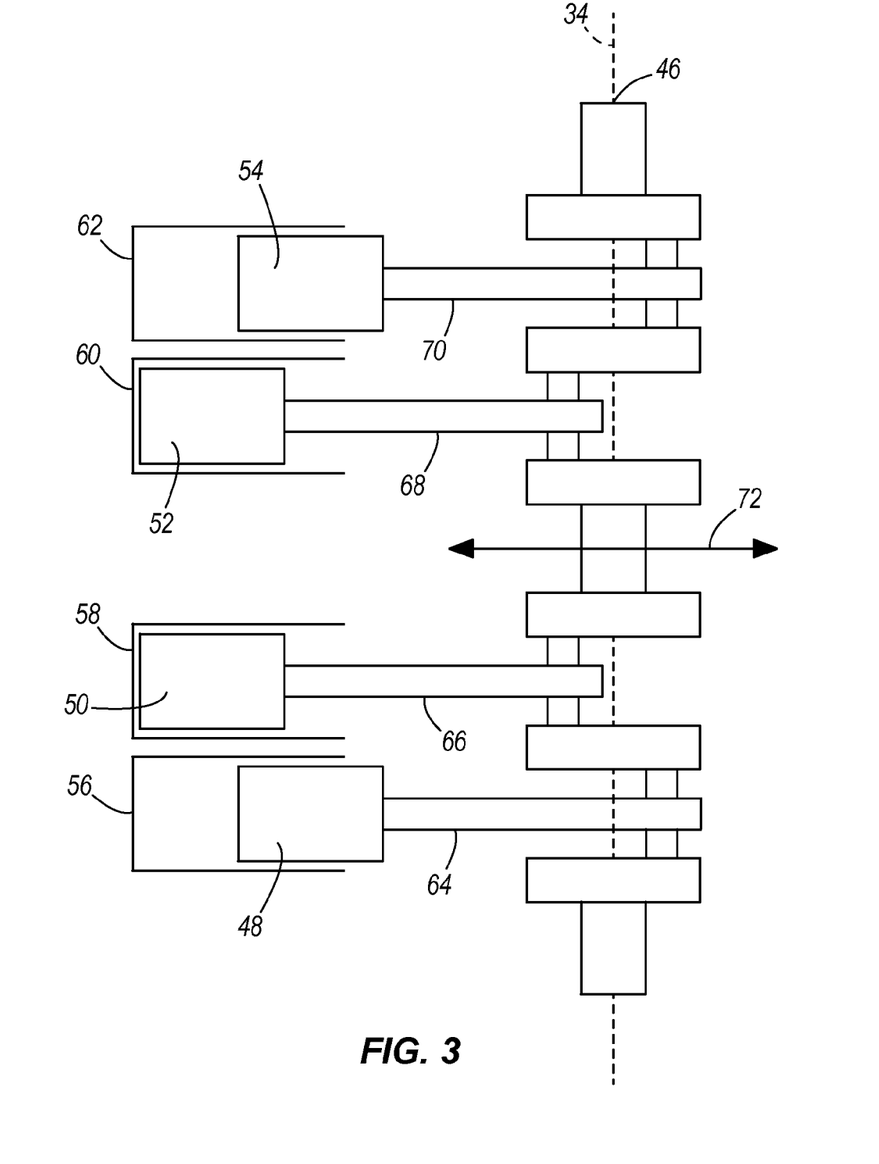
FIG. 3 schematically depicts four pistons attached to a crankshaft for reciprocal motion within four associated cylinders.

FIG. 3 schematically depicts a planar crankshaft 46 supported for rotation about the vertical axis 34 and connected to pistons 48, 50, 52 and 54, which rotate within associated cylinders 56, 58, 60 and 62. The particular example shown is an inline four cylinder engine; however it should be realized that the present disclosure is applicable to other inline engine configurations such as single cylinder, inline-2 cylinder, inline-4 cylinder, inline-5 cylinder engines and/or the like. The crankshaft 46 is supported within the engine and connected to the cylinders by connecting rods 64, 66, 68 and 70. In an inline four cylinder engine, the four cylinders 56, 58, 60, 62 are disposed in an inline configuration. In this type of arrangement, pairs of pistons move in a coordinated manner. Pistons 48 and 54 reach their top dead center and bottom dead center positions simultaneously and the positions, velocities, and accelerations of the pair of pistons 48, 54 are identical to each other throughout the complete rotation of the planar crankshaft 46. Similarly, pistons 50, 52 move in a coordinated manner with identical positions, velocities, and accelerations throughout their range of travel. In addition, when pistons 48, 54 are at their bottom dead center positions, as illustrated in FIG. 3, pistons 50, 52 are at their top dead center positions. As a result of this type of configuration, the primary forces and moments are inherently balanced. However, since the pair of pistons moving near their top dead center positions experience greater accelerations than the other two pistons which are simultaneously near their bottom dead center positions, unbalanced forces are created. These unbalanced accelerations result in a shaking force represented by arrow 72 in FIG. 3, which are undesirable.

Figure 4:
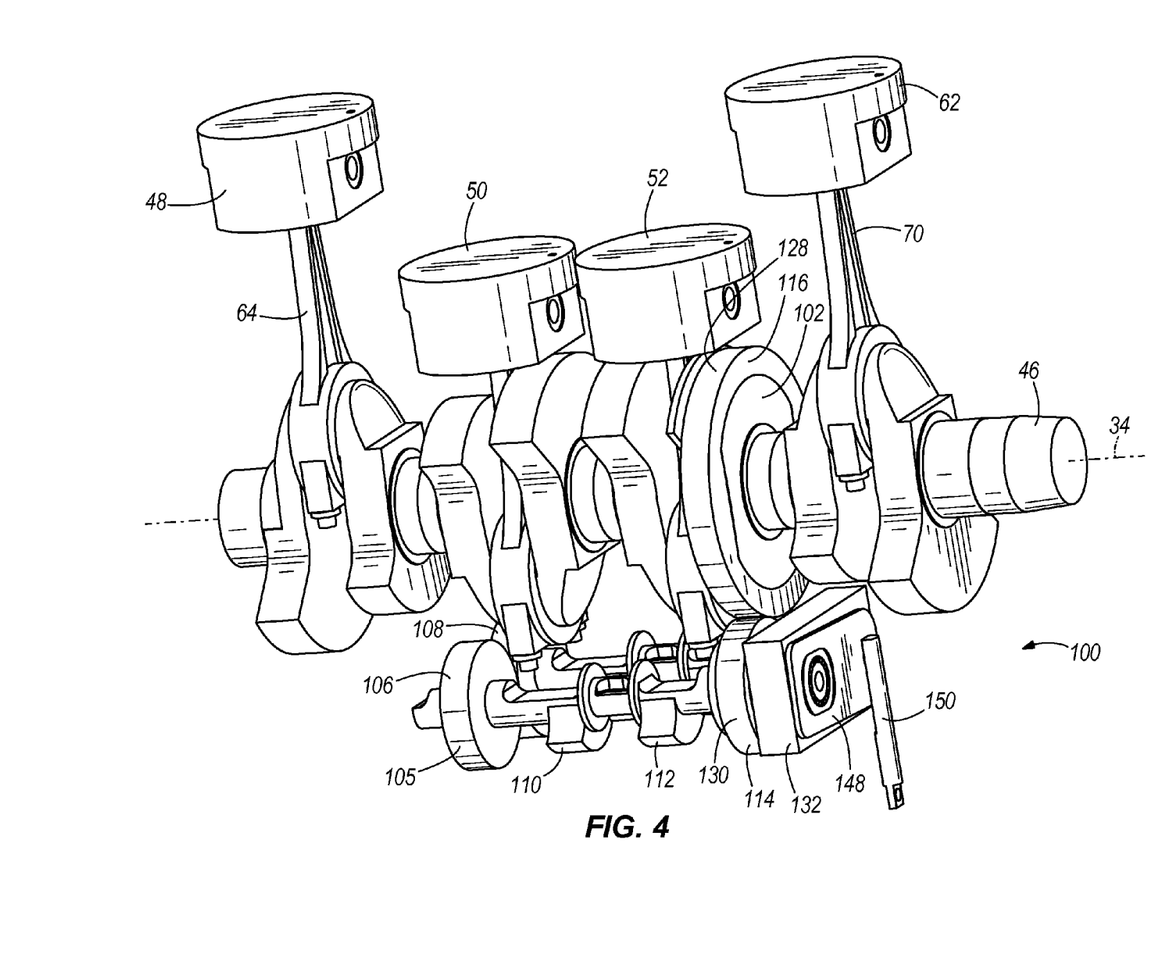
FIG. 4 is a perspective view of a crankshaft and a balance shaft arrangement.
Figure 5:
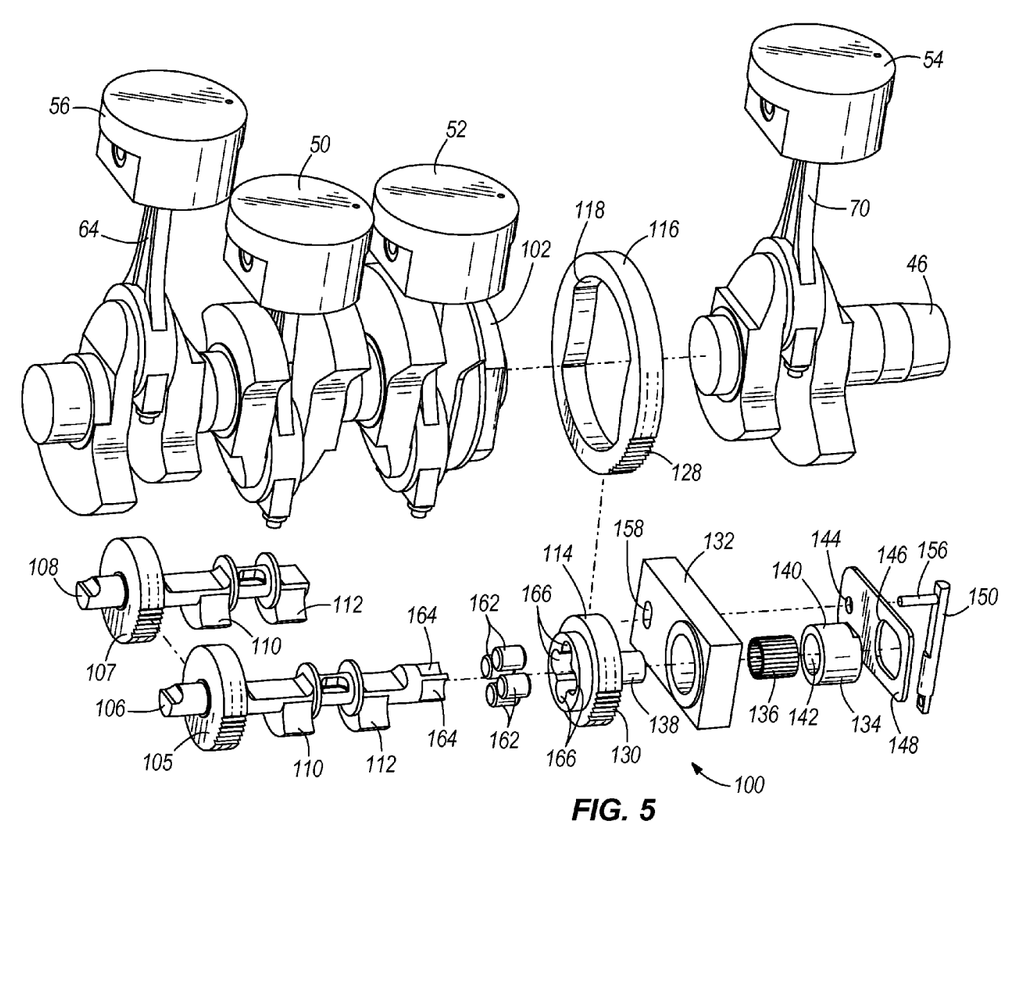
FIG. 5 is like FIG. 4, showing the balance shaft arrangement in exploded view.
Figure 6:
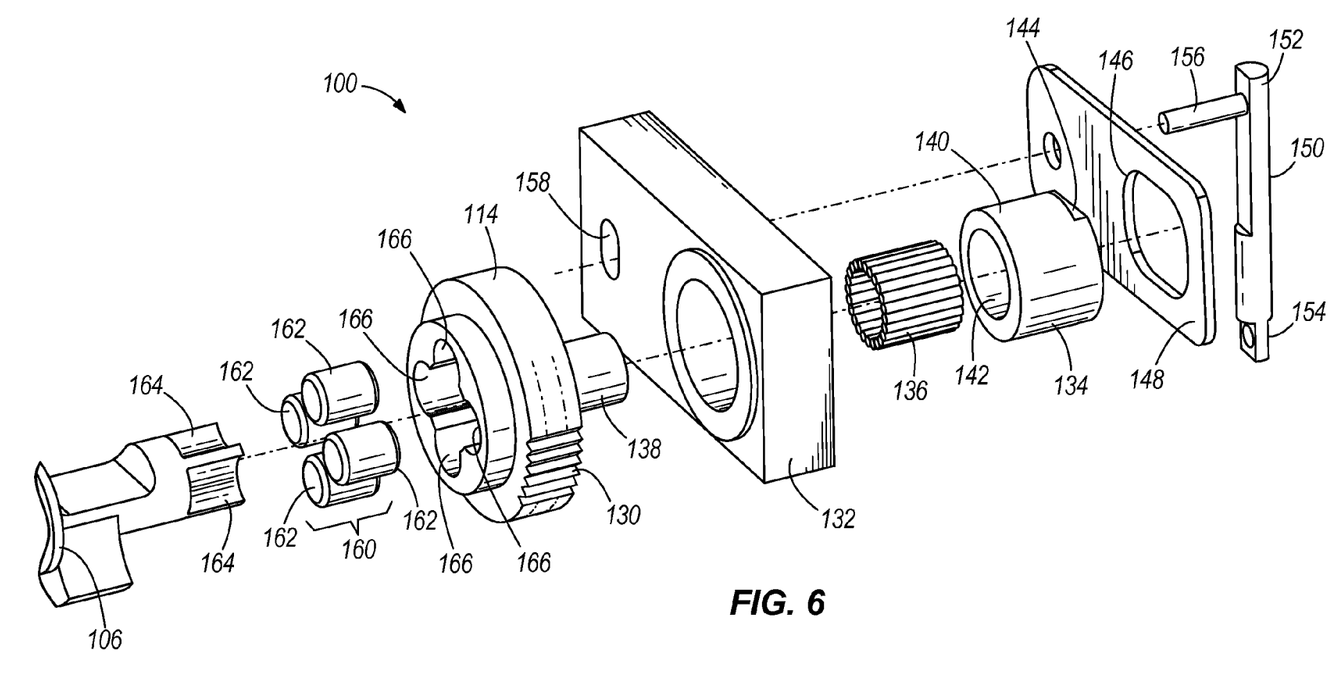
FIG. 6 is a closer view of the balance shaft arrangement in FIG. 4.

FIGS. 4-6 depict a balance shaft arrangement 100 for balancing the effects of the problematic secondary vibrational forces discussed above. The balance shaft arrangement 100 is connected by gears to the crankshaft 46 shown in FIGS. 4-5. A drive gear 102 rotates with the crankshaft 46 about the crankshaft axis 34. Two balance shafts 106, 108 are supported for rotation so as to balance the secondary vibrational forces of the crankshaft 46. Each balance shaft 106, 108 has counterweights 110, 112 that are sized and oriented in a conventional manner to achieve the noted balancing effect during rotation of the balance shafts 106, 108. The balance shaft 106 has a toothed gear 105 that is meshed with a toothed gear 107 on the balance shaft 108 such that rotation of the balance shaft 106 causes rotation of the balance shaft 108. This type of arrangement is conventionally referred to as a "twin balance system". A driven gear 114 is attached to the balance shaft 106. Rotation of the drive gear 102 on the crankshaft 46 causes rotation of the driven gear 114, which in turn causes the noted rotation of the balance shaft 106 and balance shaft 108. Connection of the drive gear 102 to the driven gear 114, and connection of the driven gear 114 to the balance shaft 106 will be discussed in more detail herein below.

The drive gear 102 has a drive sprocket 116 disposed on its outer circumference. The drive sprocket 116 has a double D shaped inner circumferential surface 118 for limiting transfer of vibration of the crankshaft 46 to the balance shaft arrangement 100. The relatively loose fit double D type connection provides a self-aligning feature that does not require a press fit with the drive gear 102 and thus can be easily assembled and disassembled. The exact contour and configuration of the inner surface 118 of the drive sprocket 116 can vary from that which is shown. In the particular example shown, the inner surface 118 has opposing concave or curved surfaces 120, 122 (see FIGS. 7 and 8), which are curved inwardly towards the drive sprocket 116 and mate with correspondingly inwardly curved outer surfaces 124, 126 (see FIGS. 7 and 8) on the drive gear 102. The curved surfaces 120, 122 have been found to advantageously reduce impact stress on the drive gear 102. Instead of being curved in the manner shown, the surfaces 120, 122, 124, 126 each could have a plurality of curves or could for example be straight or substantially straight. The double D connection de-couples the crankshaft 46 and balance shaft arrangement 100, thus preventing transfer of vibrations. In the example of the outboard motor 10 shown in FIG. 1, the double D connection further allows for vertical movement of the overall connection, thus providing a self-aligning feature.

The drive sprocket 116 has an outer toothed surface 128 for engaging in a meshed connection with an outer toothed surface 130 of the driven gear 114. In this type of arrangement, the present inventor has realized that during operation of the respective drive gear 102 and driven gear 114, the relatively rigid, meshed engagement between the outer toothed surface 128 and the outer toothed surface 130 causes loud gear noise which can be undesirable and difficult to suppress. The examples described herein thus advantageously allow for adjustments of the center of the driven gear 114 with respect to the center of the drive gear 102 to reduce this noise.

FIGS. 5 and 6 depict aspects of the balance shaft arrangement 100 in more detail. The driven gear 114 is supported with respect to a fixed portion 132 of the outboard motor 10, which can be for example part of the crank case of the outboard motor 10. The driven gear 114 can be supported with respect to the fixed portion 132 in a variety of ways that allow for movement of the driven cylinder 134 radially towards and away from the drive gear 102. In this example, a combination of a cylinder 134 and bearing 136 supports the driven gear 114. More specifically, the driven gear 114 has a stub shaft 138 that extends into bearing 136, which in this example is made up of a series of needle bearings. Other types of bearings could be employed instead of or in addition to needle bearings. The stub shaft 138 and bearing 136 together reside in the cylinder 134. The cylinder 134 has an outer circumferential surface 140 and an inner circumferential surface 142 that is eccentrically aligned with respect to the outer circumferential surface 140, such that rotation of the cylinder 134 with respect to the fixed portion 132 in one direction causes the stub shaft 138 of the driven gear 114 to move towards the drive gear 102 along an arcuate path, and thus causes the outer toothed surface 130 of the driven gear 114 to mesh closer together with the outer toothed surface 128 of the drive gear 102. Rotation of the cylinder 134 in the opposite direction moves the stub shaft 138 of the driven gear 114 away from the drive gear 102 along the noted arcuate path and thus causes separation of outer toothed surface 128 of the driven gear 114 and the outer toothed surface 130 of the drive gear 102. The degree of eccentricity between the inner and outer circumferential surfaces 140, 142 of the cylinder 134 can vary depending upon the design of the balance shaft arrangement 100. In one example, the outer circumferential surface 140 can be offset from the inner circumferential surface by 1 millimeter. Other offset distances can be employed.

The inventor has found that the above-described relative movement between the drive gear 102 and driven gear 114 allows an operator to manually adjust the alignment between the outer toothed surface 128 and the outer toothed surface 130 so as to significantly reduce gear noise. The balance shaft arrangement 100 allows for the noted relative movement of the driven gear 114 towards and away from the drive gear 102 to change the alignment between the meshed teeth on the gears 102, 114, thus reducing gear noise.

Movement of the driven gear 114 can be manually controlled. The cylinder 134 has opposing tangential recesses 144 on one end for engaging with engagement surfaces 146 of a support plate 148 disposed on one side of the fixed portion 132 such that rotation of the support plate 148 with respect to the fixed portion 132 causes rotation of the cylinder 134 with respect to the fixed portion 132 and such that the support plate 148 and cylinder 134 rotate together. A lever 150 is attached to the support plate 148 for manually rotating the support plate and cylinder 134. The lever 150 has first and second ends 152, 154, and the second end 154 can extend out of the internal combustion engine 16 for manual grasping by the operator. The lever 150 is connected to the support plate 148 by an attachment rod 156 that extends through the support plate 148 into a slot 158 in the fixed portion 132. Manually grasping and moving the lever 150 causes movement of the plate 148 and cylinder 134, thus adjusting the radial distance between the driven gear 114 and drive gear 102 in the manner described herein above. In other words, rotating the plate 148 causes the location of the center axis of the driven gear 114 to change with respect to the location of the center axis of the drive gear 102, thereby adjusting the gear-center distance. This can reduce sudden impact on the teeth of the toothed surfaces 128, 130, which causes the noted gear noise. Other connections between the lever and cylinder 134 could be employed in addition to or instead of the support plate 148 and tangential recesses 144.

Figure 7:
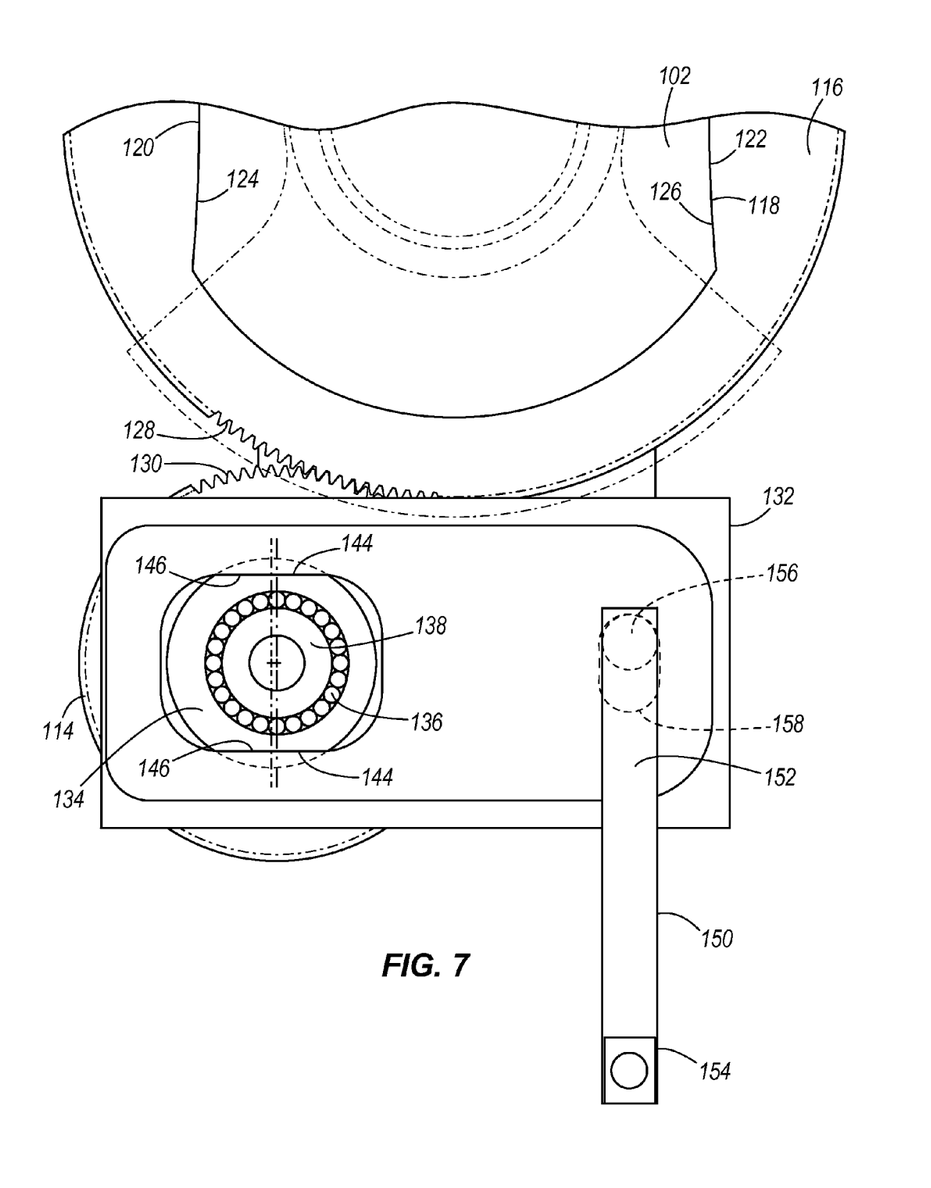
FIG. 7 is a plan view of a drive gear, driven gear and a lever for moving the driven gear towards and away from the drive gear.
Figure 8:
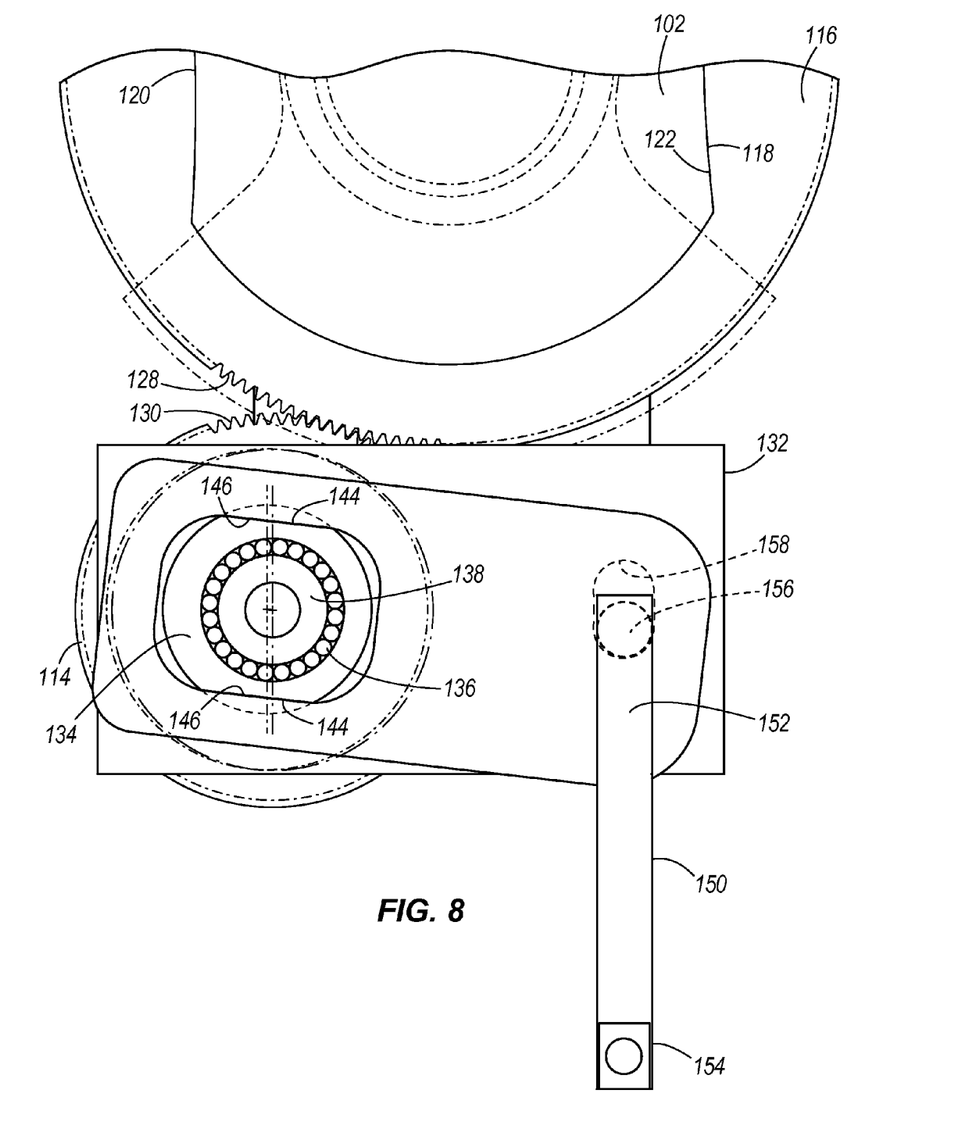
FIG. 8 is a view like FIG. 7, depicting the driven gear positioned towards the drive gear, as compared to the example shown in FIG. 7.

FIGS. 7 and 8 depict the driven gear 114 at different positions relative to the drive gear 102. Specifically, FIG. 7 depicts the driven gear 114 positioned relatively farther away from the drive gear 102, as compared to FIG. 8. This is accomplished by movement of the lever 150 towards the drive gear 102 such that the attachment rod 156 is positioned forwardly in the slot 158 towards the drive gear 102. This moves the support plate 148 and causes the noted eccentric movement of the driven gear 114 via the cylinder 134. FIG. 8 depicts the driven gear 114 positioned relatively closer to the drive gear 102, as compared to FIG. 7. This is accomplished by movement of the attachment rod 156 away from the drive gear 102 such that the attachment rod 156 is positioned rearwardly in the slot 158 away from the drive gear 102. As described above, movement between the positions shown in FIGS. 7 and 8 can be manually implemented to affect gear noise.

Referring to FIGS. 5 and 6, the driven gear 114 is connected to the balance shaft 106 so that rotation of the driven gear 114 causes rotation of the balance shaft 106. A dampening member 160 is disposed between the driven gear 114 and balance shaft 106 and accommodates the noted radial movement and positioning of the driven gear 114 with respect to the drive gear 102 and the balance shaft 106. The dampening member 160 can be a resilient member such as for example rubber, that is capable of absorbing the differences in the center axis of the driven gear 114 and the center axis of the balance shaft 106 when the driven gear 114 is moved towards or away from the drive gear 102 to reduce the noted gear noise. The dampening member 160 further advantageously dampens the transfer of vibrations caused by torque fluctuations in the crankshaft 46 to the balance shafts 106, 108. In this example, the dampening member 160 is radially sandwiched between the balance shaft 106 and the driven gear 114. The dampening member 160 is made of a plurality of rubber packs or plugs 162 that are disposed in a plurality of recesses 164 on the end of the balance shaft 106. Plugs 162 are disposed in similarly shaped recesses 166 in the driven gear 114. The number, shape and configuration of plugs 162 and recesses 164, 166 can vary from that which is shown. The number, shape and configuration of plugs 162 and recesses 164, 166 can be selected so as to provide enough clearance, i.e. so that the noted differences between the center axes of the driven gear 114 and balance shaft 106 can be absorbed.

Although only a few examples have been described in detail herein above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. A marine engine, comprising:
   a crankshaft that is supported for rotation about a crankshaft axis;
   a drive gear that rotates with the crankshaft;
   a balance shaft that is supported for rotation so as to balance secondary vibrational forces of the crankshaft;
   a driven gear that causes rotation of the balance shaft;
   wherein said drive gear causes rotation of the driven gear and wherein the driven gear is selectively radially movable towards and away from the drive gear about an eccentric axis;
   a cylinder that supports the driven gear, the cylinder comprising an outer circumferential surface and an inner circumferential surface that is eccentrically aligned with respect to the outer circumferential surface, wherein rotation of the cylinder in one direction moves the driven gear towards the drive gear and wherein rotation of the cylinder in an opposite direction moves the driven gear away from the drive gear; and
   a support plate coupled to the cylinder, wherein rotation of the support plate causes rotation of the cylinder.

2. A marine engine according to claim 1, wherein the driven gear is radially movable into and out of alignment with the balance shaft.

3. A marine engine according to claim 1, wherein the driven gear is radially movable towards and away from the drive gear along an arcuate path.

4. A marine engine according to claim 1, wherein the support plate comprises an engagement surface and wherein the cylinder comprises at least one tangential recess engaged with the engagement surface so that the support plate and cylinder rotate together.

5. A marine engine according to claim 1, comprising a lever coupled to the support plate for manually rotating the support plate and cylinder.

6. A marine engine, comprising:
  a crankshaft that is supported for rotation about a crankshaft axis;
  a drive gear that rotates with the crankshaft;
  a balance shaft that is supported for rotation so as to balance secondary vibrational forces of the crankshaft;
  a driven gear that causes rotation of the balance shaft;
  wherein rotation of the drive gear causes rotation of the driven gear and wherein the driven gear is selectively radially movable towards and away from the drive gear about an eccentric axis;
  a cylinder that supports the driven gear, the cylinder comprising an outer circumferential surface and an inner circumferential surface that is eccentrically aligned with respect to the outer circumferential surface, wherein rotation of the cylinder in one direction moves the driven gear towards the drive gear and wherein rotation of the cylinder in an opposite direction moves the driven gear away from the drive gear;
  wherein the driven gear comprises a stub shaft that extends into the cylinder.

7. A marine engine according to claim 6, comprising at least one hearing disposed between the stub shaft and the cylinder.

8. A marine engine, comprising:
  a crankshaft that is supported for rotation about a crankshaft axis;
  a drive gear that rotates with the crankshaft;
  a first balance shaft that is supported for rotation so as to balance secondary vibrational forces of the crankshaft;
  a driven gear that causes rotation of the first balance shaft;
  a second balance shaft that is su oiled for rotation so as to balance secondary vibrational forces of the crankshaft, wherein rotation of the first balance shaft causes rotation of the second balance shaft;
  wherein the drive gear causes rotation of the driven gear and wherein the driven gear is selectively radially movable towards and away from the drive gear;
  a dampening member that is disposed between the driven gear and the balance shaft, wherein the dampening member accommodates radial movement of the driven gear into and out of alignment with the balance shaft;
  wherein the dampening member is radially sandwiched between the balance shaft and the driven gear; and
  wherein the dampening member comprises a plurality of plugs and wherein the balance shall comprises a plurality of recesses containing the plurality of plugs.

9. A marine engine according to claim 8, wherein the dampening member comprises a resilient material.

10. A marine engine, comprising:
  a crankshaft that is supported for rotation about a crankshaft axis;
  a drive gear that rotates with the crankshaft;
  a balance shaft that is supported for rotation so as to balance secondary vibrational forces of the crankshaft;
  a driven gear that causes rotation of the balance shaft;
  wherein rotation of the drive gear causes rotation of the driven gear and wherein the driven gear is selectively radially movable towards and away from the drive gear; and
  a drive sprocket disposed on the drive gear and having a double D shaped inner surface engaging with an outer surface of the drive gear.

11. A marine engine, comprising:
  a crankshaft that is supported for rotation about a crankshaft axis;
  a drive gear that is supported for rotation with the crankshaft;
  a balance shaft that is supported for rotation so as to balance secondary vibrational forces of the crankshaft;
  a driven gear that is driven into rotation by the drive gear, the driven gear being connected to the balance shaft so as to drive the balance shaft into rotation;
  a second balance shaft that is driven into rotation by rotation of the first balance shaft;
  wherein the driven gear is selectively radially positionable towards and away from the crankshaft axis to thereby adjust the distance between the drive gear and driven gear, which thereby reduces gear noise;
  wherein the driven gear is radially positionable into and out of alignment with the balance shaft; and
  a dampening member between the driven gear and the balance shaft and accommodating said positioning of the driven gear with respect to the balance shaft;
  wherein the dampening member comprises a plurality of plugs and wherein the balance shaft comprises a plurality of recesses containing the plurality of plugs.

* * * * *

UNITED STATES PATENT AND TRADEMARK OFFICE
CERTIFICATE OF CORRECTION

| | |
|---|---|
| PATENT NO. | : 9,234,457 B1 |
| APPLICATION NO. | : 13/364131 |
| DATED | : January 12, 2016 |
| INVENTOR(S) | : Masahiro Yukioka |

It is certified that error appears in the above-identified patent and that said Letters Patent is hereby corrected as shown below:

In the Claims

In claim 7, at column 7, line 35, "hearing" should instead read --bearing--.

In claim 8, at column 7, line 44, "su oiled" should instead read --supported--.

In claim 8, at column 8, line 8, "shall" should instead read --shaft--.

Signed and Sealed this
Twenty-second Day of March, 2016

Michelle K. Lee
*Director of the United States Patent and Trademark Office*